(12) United States Patent
Chen

(10) Patent No.: US 6,257,128 B1
(45) Date of Patent: Jul. 10, 2001

(54) ROASTER OVEN

(76) Inventor: Ying-Fu Chen, No. 13, Kai Fa 2nd Road, Jen Teh Hsiang, Tainan Hsien (TW)

( * ) Notice: Subject to any disclaimer, the term of this patent is extended or adjusted under 35 U.S.C. 154(b) by 0 days.

(21) Appl. No.: 09/753,984

(22) Filed: Dec. 29, 2000

(51) Int. Cl.[7] .............................. A47J 37/00; A47J 37/04; A47J 37/07
(52) U.S. Cl. ........................ 99/421 H; 99/419; 99/427; 99/448
(58) Field of Search .................... 99/339, 340, 352–355, 99/400, 401, 419–421 V, 444–450, 426, 427, 481, 482, 467, 473–476, 516, 534–536; 126/25 R, 9 R, 41 R; 219/400, 401–404, 386

(56) References Cited

U.S. PATENT DOCUMENTS

| | | | |
|---|---|---|---|
| 1,263,331 | * 4/1918 | Lindroth | 99/446 |
| 2,618,730 | * 11/1952 | Panken | 99/421 H |
| 2,696,163 | * 12/1954 | Galley | 99/421 H |
| 2,762,293 | * 9/1956 | Boyajian | 99/421 P |
| 2,885,950 | * 5/1959 | Stoll et al. | 99/421 H |
| 3,104,605 | * 9/1963 | McKinney | 99/421 H |
| 3,125,015 | * 3/1964 | Schlaegel | 99/421 P |
| 3,196,776 | * 7/1965 | Norton | 99/421 P |
| 3,205,812 | * 9/1965 | Booth | 99/421 P |
| 3,296,957 | * 1/1967 | Gagnon et al. | 99/444 |
| 3,333,529 | * 8/1967 | Wilson | 99/421 P |
| 3,832,989 | * 9/1974 | Belford | 126/25 R |
| 4,214,516 | * 7/1980 | Friedl et al. | 99/447 |

* cited by examiner

Primary Examiner—Timothy F. Simone

(57) ABSTRACT

A roaster oven includes a housing, a door combined with a front side of the housing and a rotating frame for piercing food placed in the housing. A support base is respectively provided under two sides of the bottom of the housing for the door to be opened and placed under the housing and between the two support bases. The housing has a guide slot respectively formed in two inner opposite sidewalls to permit the rotating frame placed in the housing along the guide slots. Plural shove plates are provided on one of two rotatable discs of the rotating frame, and when the rotating frame rotates with one of the shove plate contact a stop rod fixed on an inner wall of the housing, that shove plate rotates one of pierce rods with food pierced on it for a certain angle. The roaster oven in the invention is easy to handle, taking small space and having high safety.

9 Claims, 20 Drawing Sheets

ROASTER OVEN

BACKGROUND OF THE INVENTION

This invention relates to a toaster oven, particularly to one having a door placed under a housing of the roaster oven after opened, and a rotating frame horizontally placed in and taken out of the housing for rotating food on the frame, convenient to handle, not taking much space for roasting food in a balanced way, and extremely safe to use.

A common conventional roaster oven generally has a door pivotally connected to a front side of a housing and pivotally opened outward for putting in or taking out food to be toasted and then the door is closed in using. This simple structure has been in use for conventional roaster ovens for long. However, the conventional roaster ovens shown in FIGS. 1 and 2 have an disadvantage that when the door 20 is opened for putting in or taking out food for roasting, the door 20 may automatically swing toward the front side of the roaster oven 10 as shown in FIG. 1, striking on an elbow of a user. In case of taking out just roasted food, the elbow may be burned by the highly hot door 20 and roasted food may fall down by sudden jerking of the arm of the user if worse. In case of the door swings open the most outward, it may take much space in a kitchen as shown in FIG. 1, possible to collide with a person passing by, and if the collide force is too great, the door may be pushed back to the front side of the oven 10. But if the push force against the door 20 should be excessively large, a pivotal shaft of the door may break, letting the door 20 fall off the oven 10.

In addition, the conventional roaster ovens have a semi-circular support frame 101, a non-circular insert groove 103 formed in one side, and a cylindrical base 102 formed in opposite side and rotated by a motor 104. Then a rotating frame 30 (or a single pricking rod) for holding or pricking food is provided in the oven as shown in FIG. 2, having two rotating discs 301 located at two opposite sides and some pricking rods 302. A first rotating disc 301 at one side of the supporting frame 101 has a circular postal member 303 and a second rotating disc 301 at one side of the cylindrical base 102 has a non-circular insert rod 304 formed to extend horizontally outward from a center. Then if the rotating frame 30 is to be put in the oven 10, the rotating frame has to be inclined a little to be pushed in the oven 10, with the insert rod 304 fitting in the insert groove 102 of the cylindrical base 102, and then with the post member 303 placed down flatly on the support frame 101. If the rotating frame 30 is to be taken out of the oven, is has to be handled with the action reverse to that just mentioned.

The structure of the conventional roaster oven cannot be said to be convenient to handle with no lighting and a narrow interior space, and in addition, the insert groove 103 of the cylindrical base 102 and the insert rod 304 of the rotating discs 301 are not circular not easy to be aligned to each other for inserting, and moreover, the insert hole 103 is not large, often needing much time in inserting the insert rod 304. Further, a heater in the oven 10 may collide the rotating frame 30 in an inclined angle, if carelessly moved, and in taking out food roasted on the rotatable frame 30, the post 303 of the rotatable disc 301 has to be pushed up a little, causing danger of a hand touch the still hot heater and burned, even if the heater is cut off.

Another disadvantage of the conventional roaster oven is that the all pricking rods 302 are fixed between the two rotatable discs 30, and food of large dimensions such as a whole chick or a whole duck and food of small dimensions such as cut meat, corn, etc. are pierced through the pricking rods 302. Then the inside of food is always farther away from the heater even if the rotating discs 30 are rotating, so the outside of food is always roasted better than the inside of food that is not directly roasted. Then food may have different color in the outside portion and the inside portion owing to unbalanced roasting. Then the main reason is the pricking rods 302 not self rotating between the two rotating discs 301.

SUMMARY OF THE INVENTION

A first objective of the invention is to offer a roaster oven having a door placed under a housing after opened, preventing the door from swinging with a pivot so as to avoid accidents, and reducing the space for using the oven with big convenience.

A second objective of the invention is to offer a roaster oven having rotating frame for placing food therein possible to be put in and taken out of the oven, not touching a hot heater in handling and having high safety in use.

A third objective of the invention is to offer a roaster oven having plural piercing rods able to rotate between two rotating discs so as to let every portion of food pierced on the piercing rods face the heater alternately to get roasted in a balanced way.

The feature of the invention is a housing, two support bases at two sides of the housing bottom, a pair of auxiliary rollers located in the inner side of the front end of the two support bases, a pair of slide rail made integral in the interior of the two support bases, and a slide roller pivotally connected to the two sides of the bottom of the door and laid on the pair of the slide rails. When the door is closed, the slide rollers of the door is located at the front end of the slide rails, and when the door is swung open with the slide rollers as fulcrums, with the two side edges laid on the auxiliary rollers and the slide rollers sliding along the slide rail to the bottom of the housing to let the door move to under the housing by means of the movement of the auxiliary rollers.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
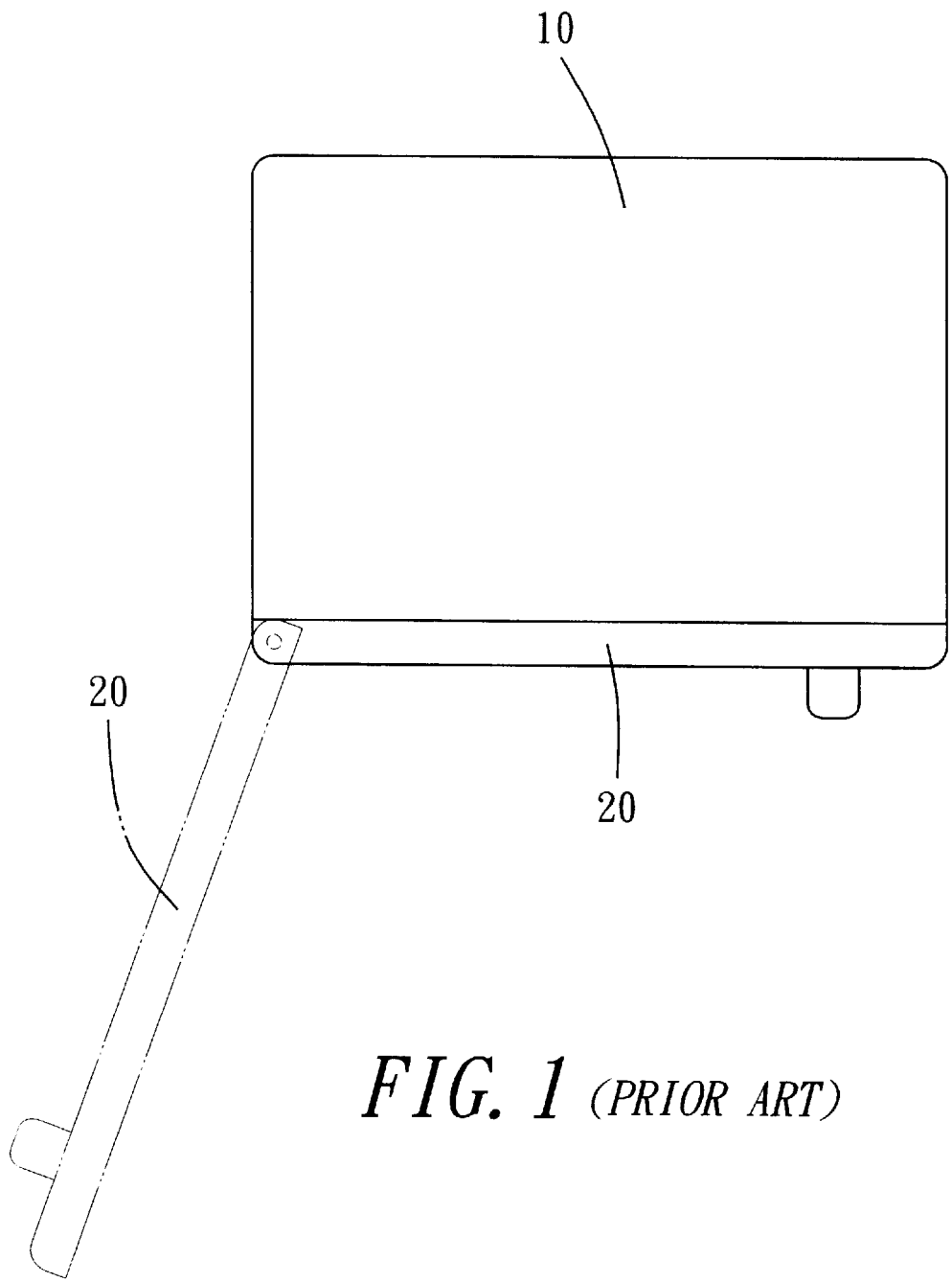
FIG. 1 is an upper view of a known conventional roaster oven.
Figure 2:
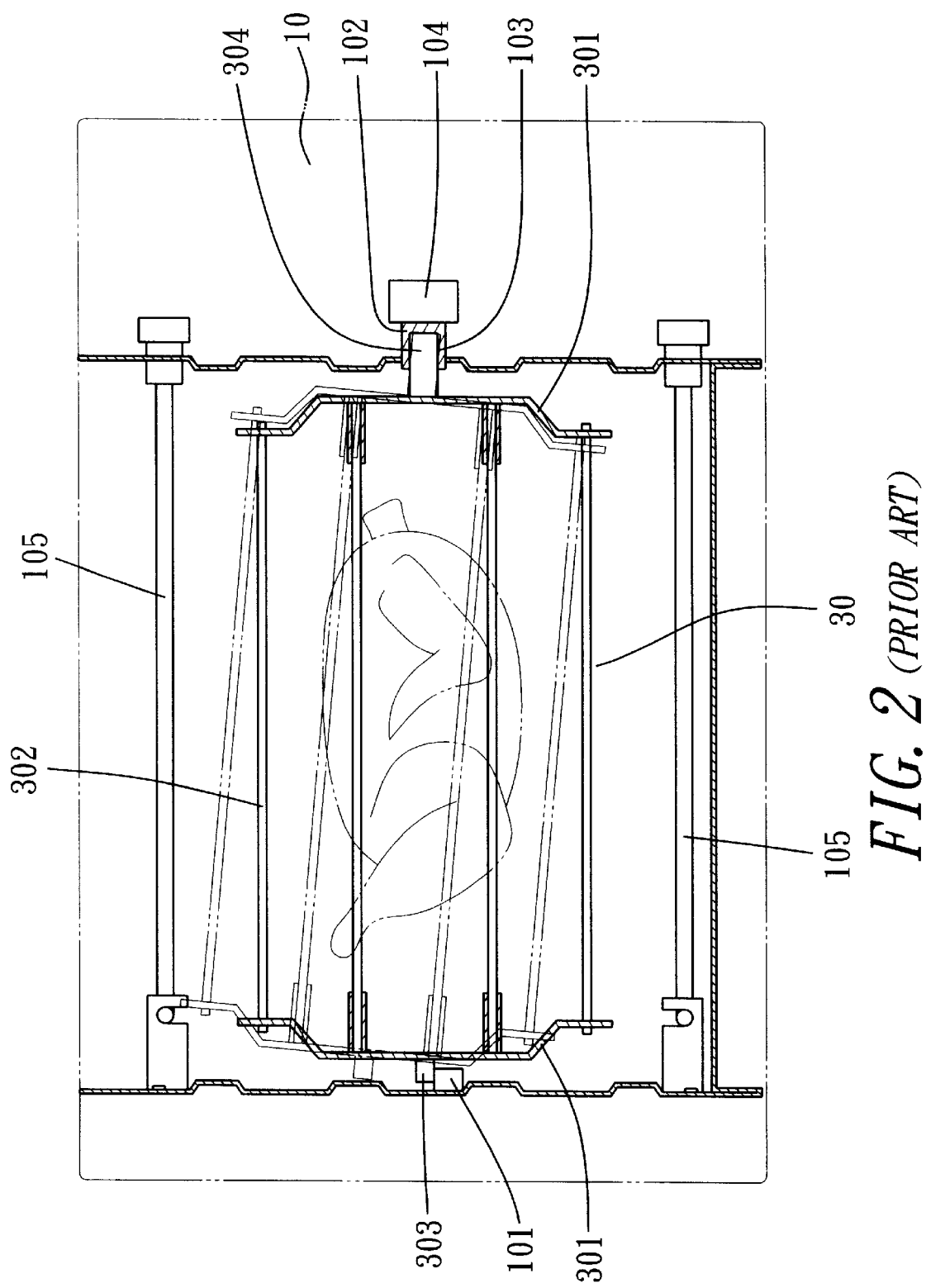
FIG. 2 is a front view of the known conventional roaster oven under handling condition.
Figure 3:
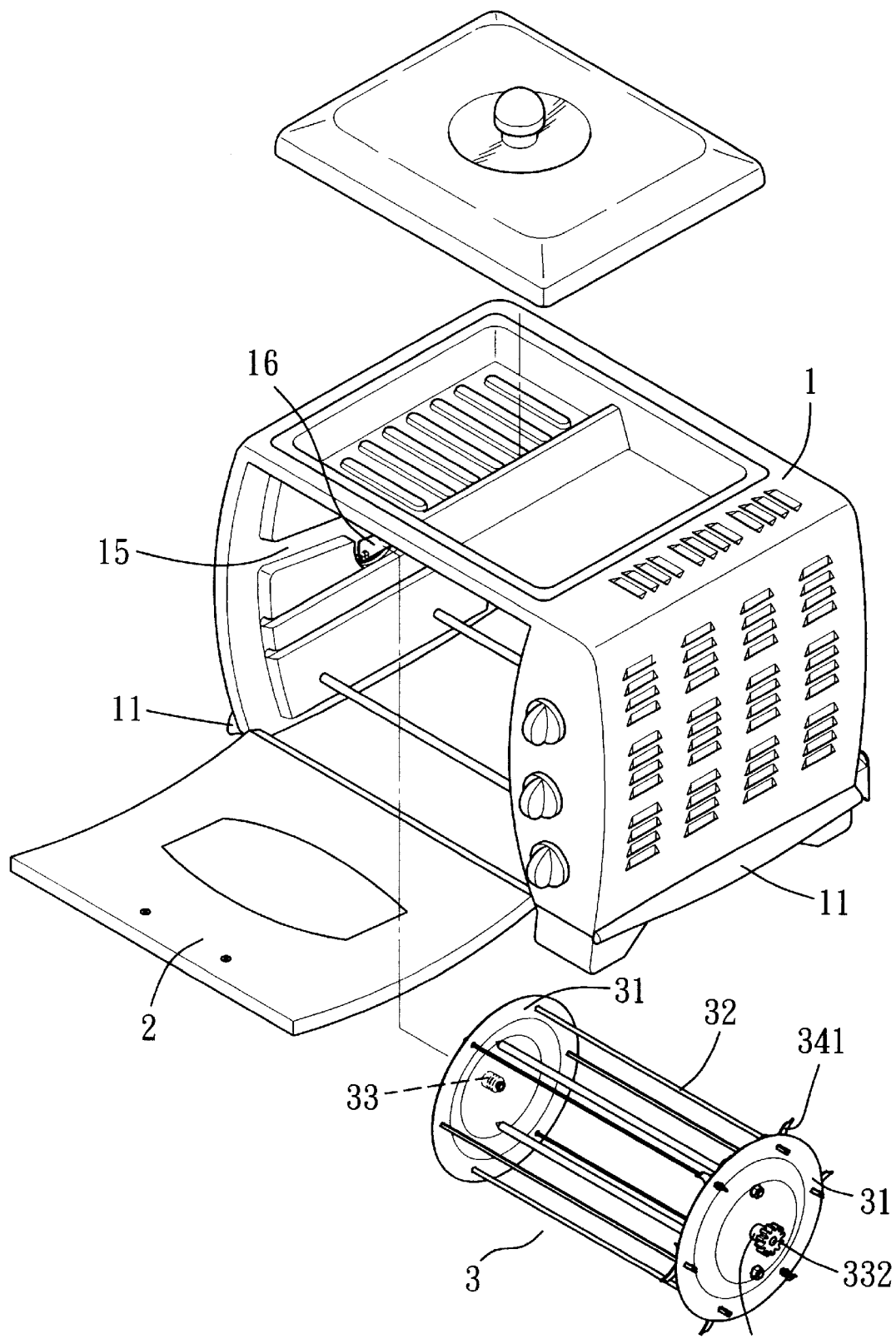
FIG. 3 is an exploded perspective view of a roaster oven in the present invention.

A preferred embodiment of a roaster oven in the present invention, as shown in FIG. 3, includes a housing 1, a door 2 combined with a front side of the housing 1, and a rotating frame 3 for piercing food placed in the housing 1.

Figure 4:
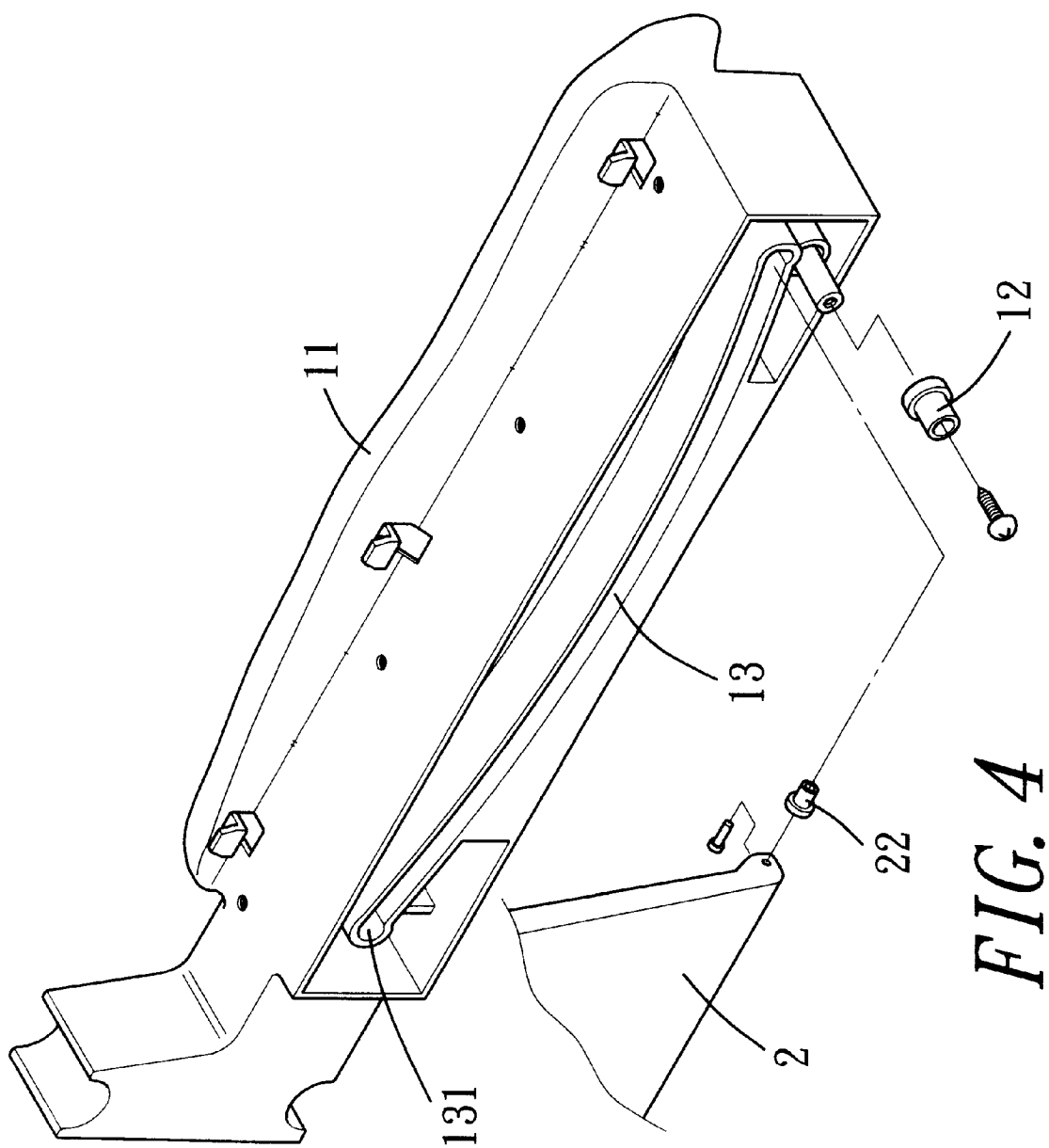
FIG. 4 is a perspective view of a door and a support base in the present invention.
Figure 5:
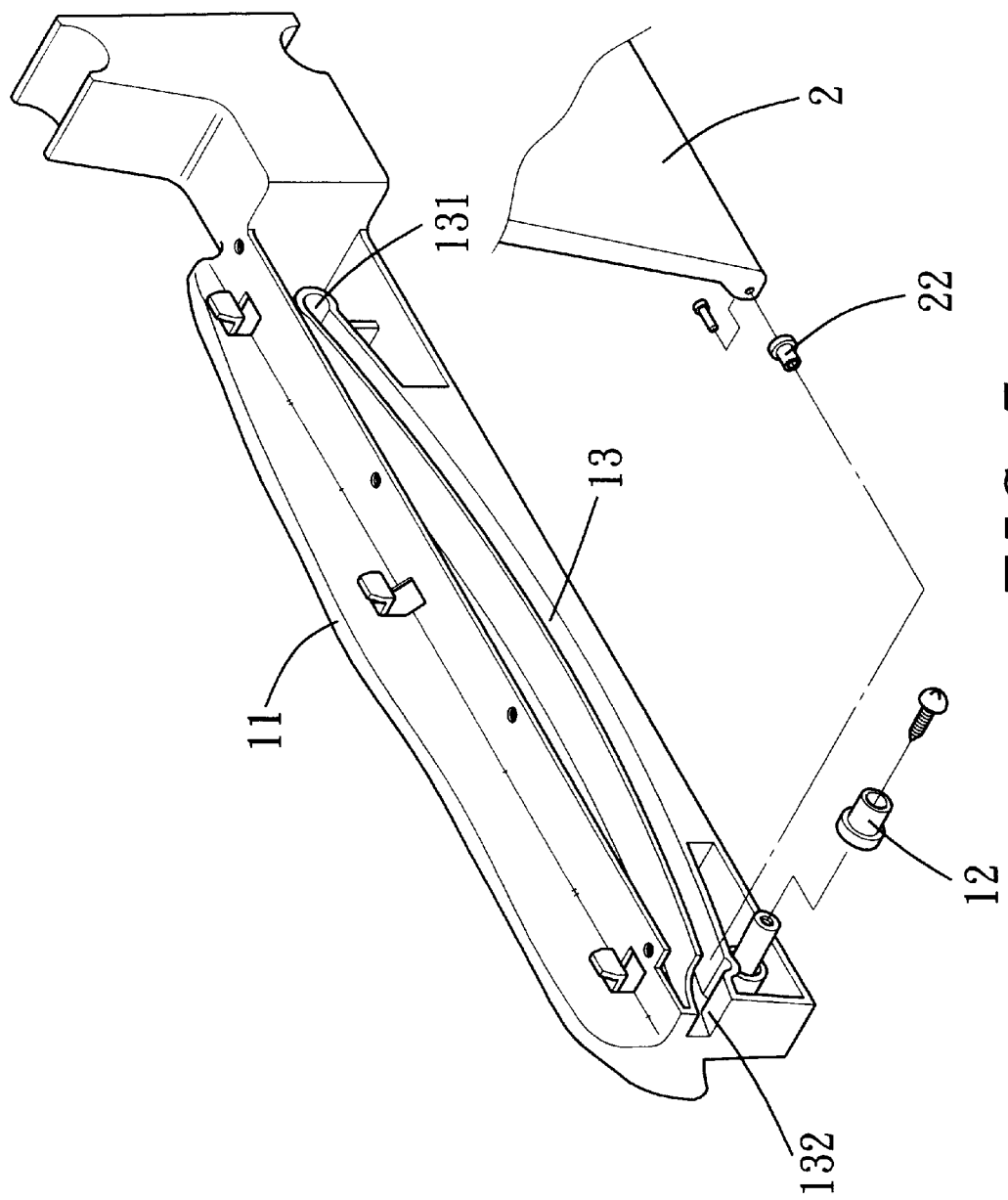
FIG. 5 is another perspective view of the door and the support base in the present invention.
Figure 6:
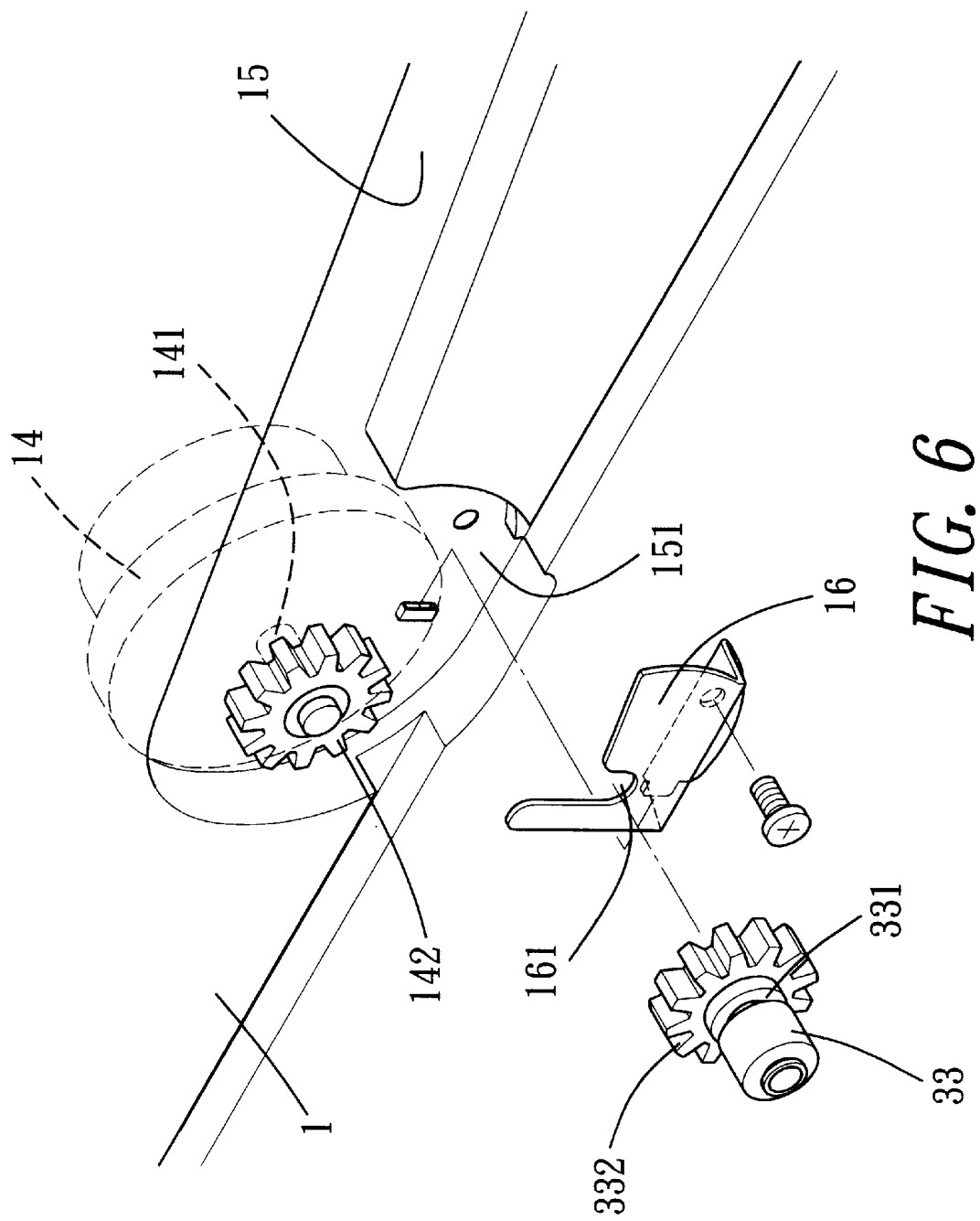
FIG. 6 is a partial enlarged exploded perspective view of the roaster oven in the present invention
Figure 7:
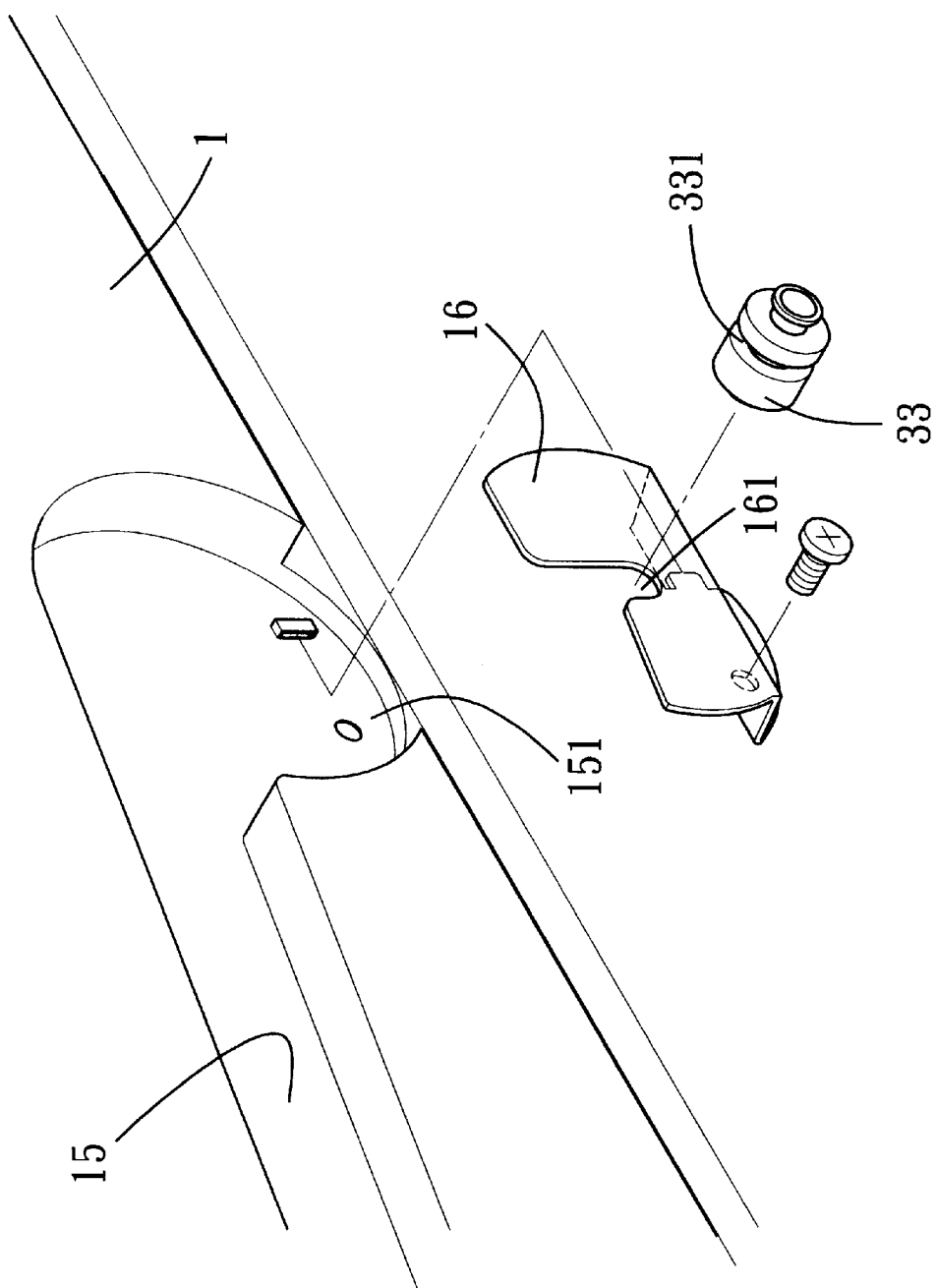
FIG. 7 is another partial enlarged exploded perspective view of the roaster oven in the present invention.
Figure 8:
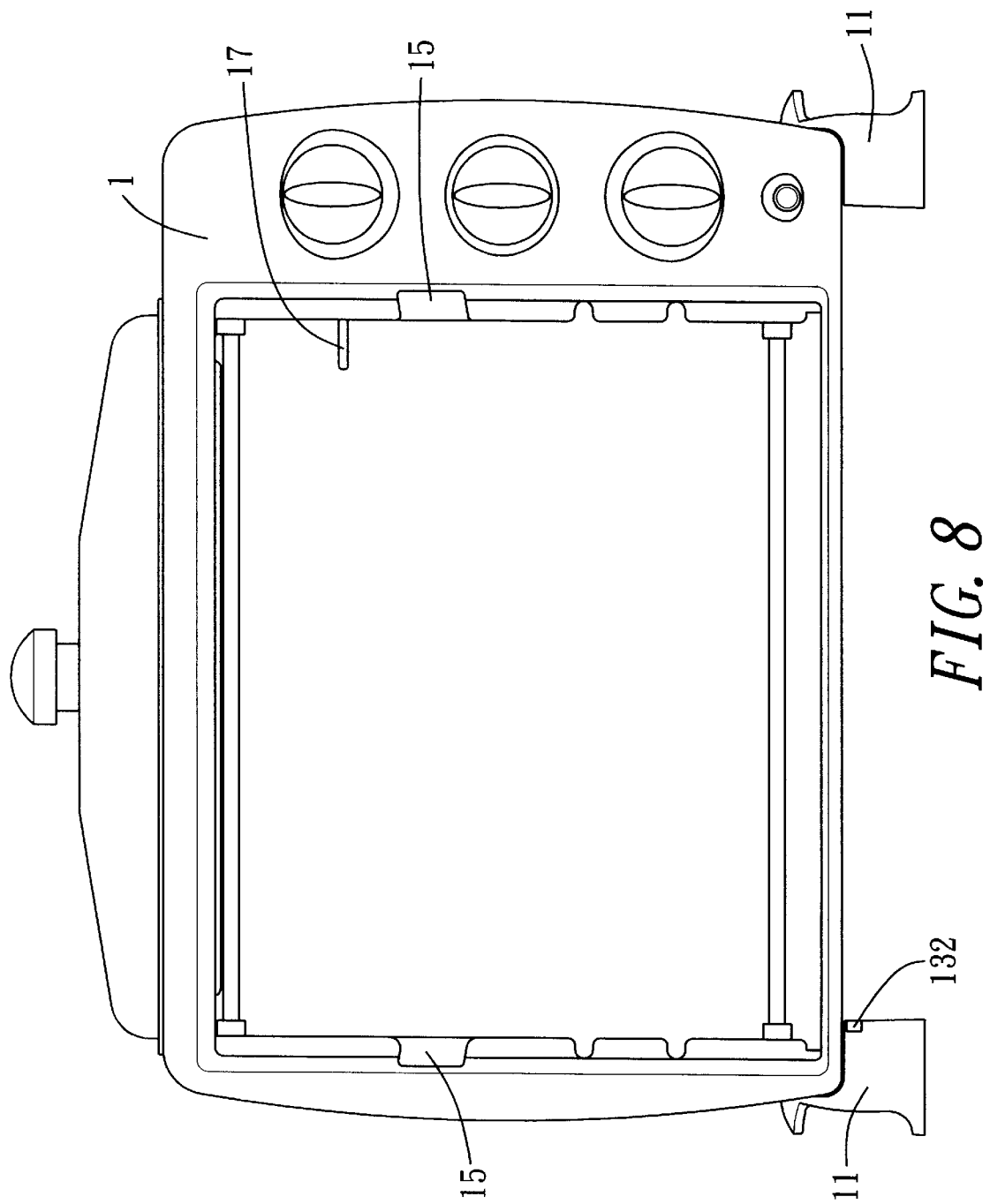
FIG. 8 is a front view of the roaster oven in the present invention.

The housing 1 has two support bases 11 fixed at two sides of its bottom, as shown in FIGS. 4 and 5, and a hollow space defined by the height of the two support bases 11 under the housing 1. Each support base 11 has an auxiliary roller 12 pivotally connected to a right interior of a front side, a concave slide rail 13 formed integral in an interior lengthwise and having a position curved recess 131 formed in a left end, and an exit hole 132 formed extending curved upward in an end wall facing the end of the slide rail 13. Further a motor 14 is provided on an inner wall of one side of the housing 1, as shown in FIG. 6, having a shaft 141 extending inward and having its end fixed with a transmitting gear 142. Further, a guide slot 15 is respectively formed in the same level in an inner wall of the two opposite sides of the housing 1 and inclining down from the two ends of the door 2 to the housing 1, a chamber 151 formed to extend down from the end of each guide slot 15, and a support plate 16 fixed on an outer surface of the chamber 151. The support plate 16 has a curved recess 161 in an intermediate portion, and the transmitting gear 142 at the end of the shaft 141 of the motor 14 extends in the chamber 151 of the guide slot 15, as shown in FIG. 6 and 7. Further, a stop rod 17 of a proper length is fixed inward on a right inner vertical wall of the housing 1, located near the rotating frame 31, as shown in FIG. 8.

Figure 13:
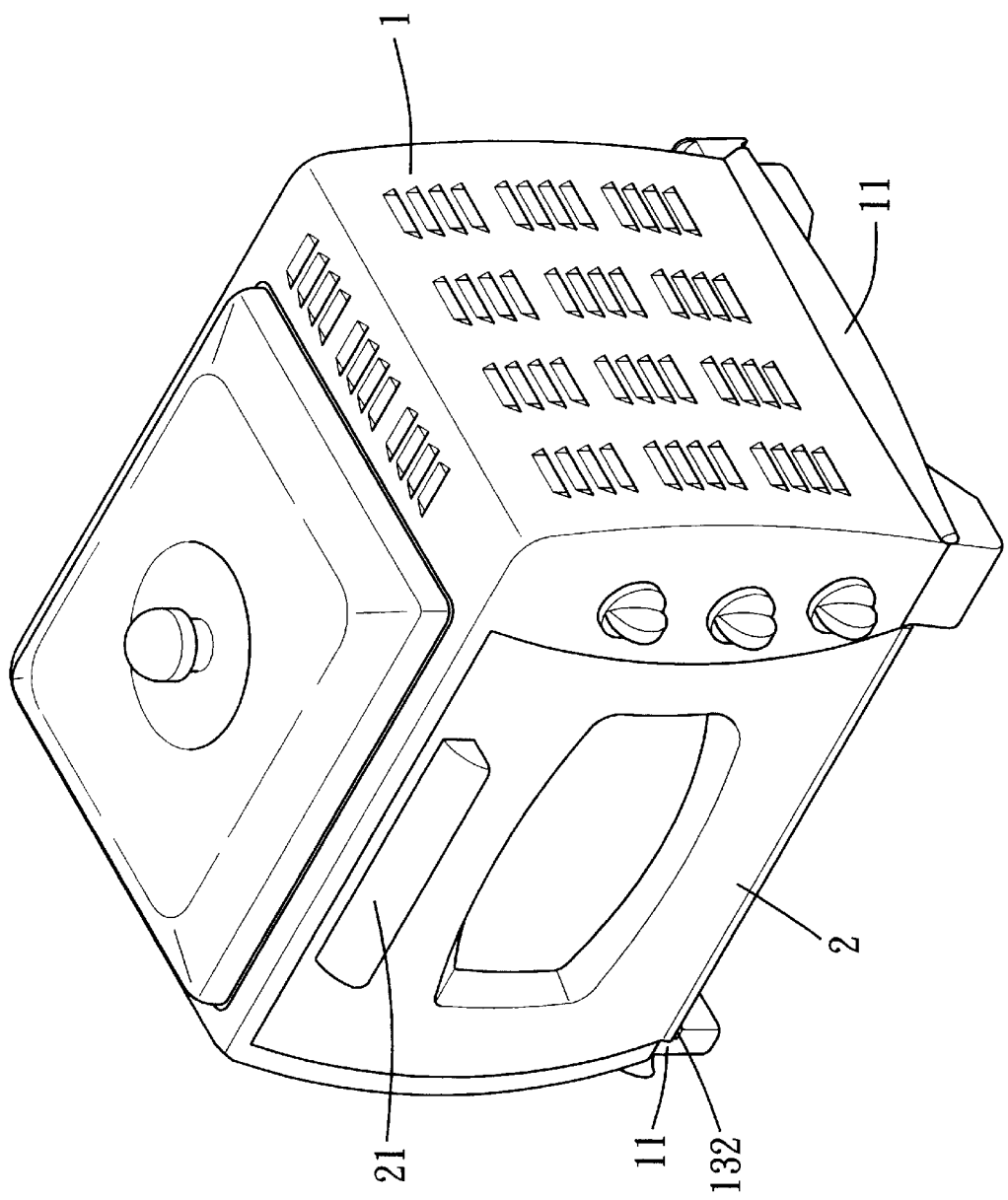
FIG. 13 is a perspective view of a roaster oven in the present invention.

The door 2 is provided at the front side of the housing 1, having a grip 21 horizontally fixed on an outer upper surface as shown in FIG. 13, and a slide roller 22 respectively pivotally connected to two opposite ends of the bottom and extending outward as shown in FIGS. 4 and 5.

Figure 9:
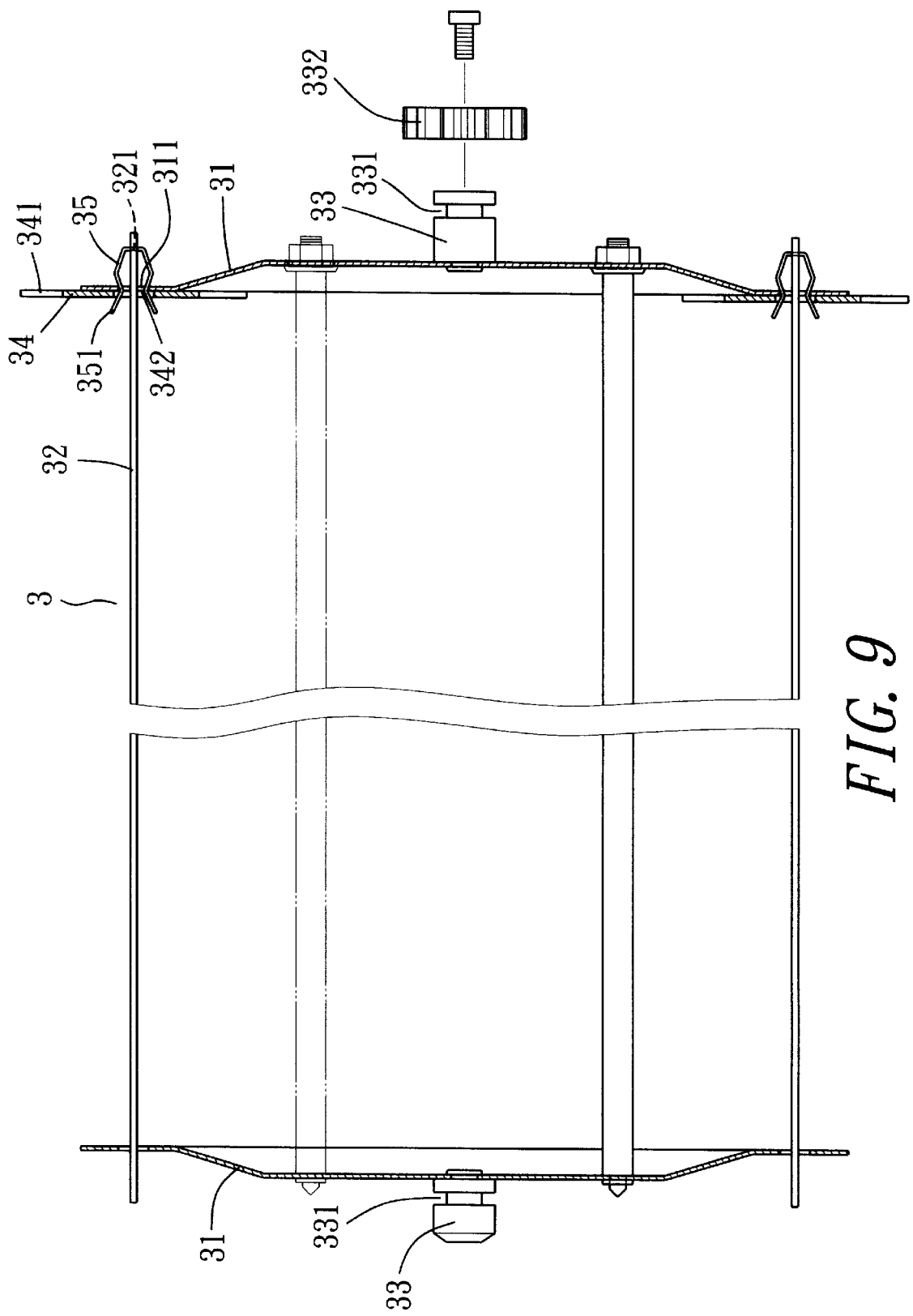
FIG. 9 is a front view of a rotating frame in the present invention.

The rotating frame 3 can be placed in the interior of the housing 1, consisting of two rotatable discs 31, plural round pierce rods 32 fixed spaced apart between the two rotatable discs 31 for piercing food as shown in FIG. 9, a shaft 33 fixed to extend from a center of the outer one of the two rotatable discs 31 and having an annular groove 331, and a subordinate gear 332 fixed with the end of the shaft 33 facing the shaft 141 of the motor 14.

Figure 10:
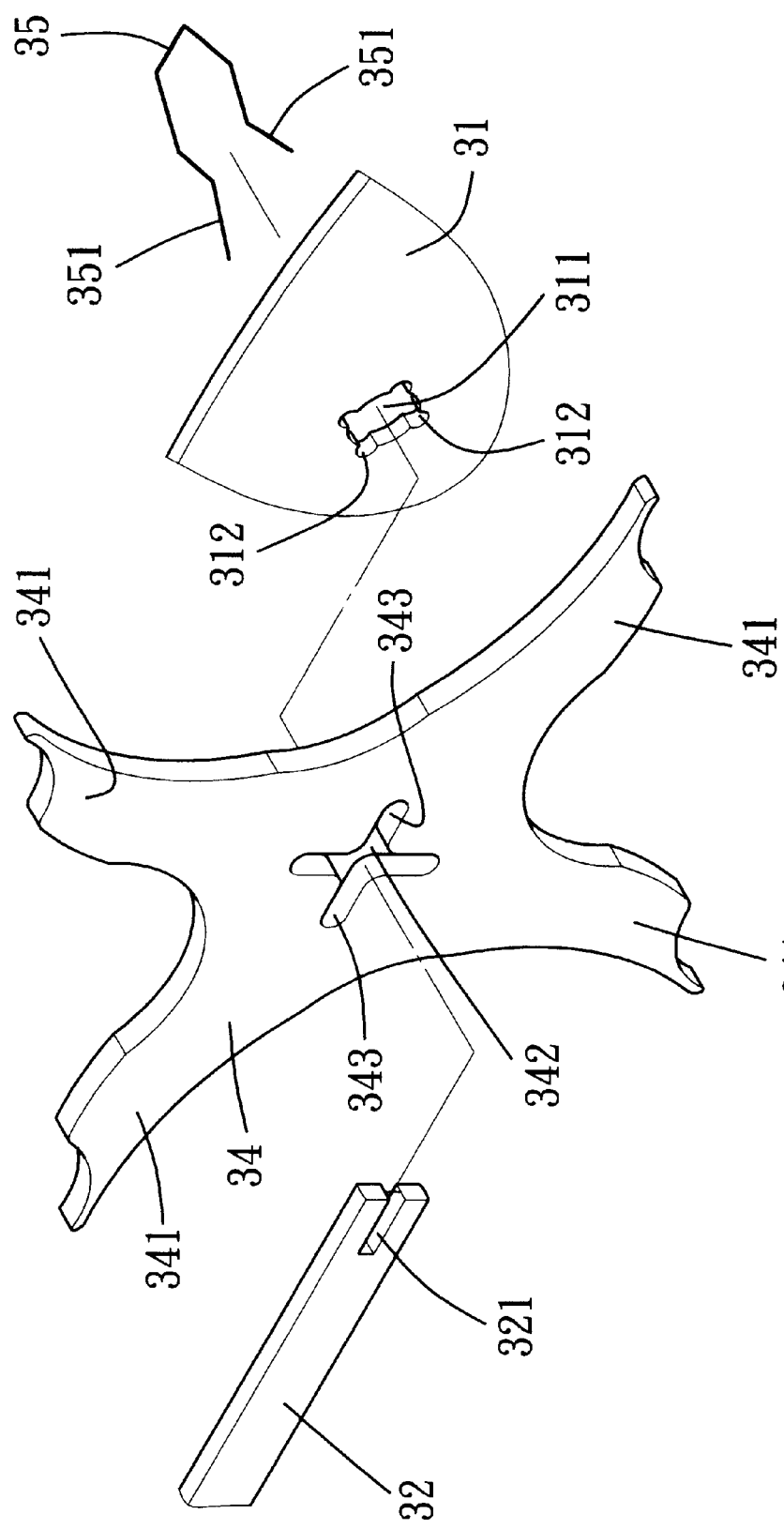
FIG. 10 is a partial exploded enlarged perspective view of the rotating frame in the present invention.

The two rotatable discs 31 have plural insert holes 311 respectively aligned to each other for the pierce rods 32 to insert between each pair of the insert holes 311 as shown in FIG. 10, and the insert hole 311 of the rotatable disc 31 near the stop rod 17 of the housing 1 has a larger diameter than that of the pierce rods 32. That insert hole 311 has plural continual position grooves 312 formed to face each other in the two opposite hole edges, and plural shove plates 34 are provided inside of one of the rotatable discs 31. The shove plates 34 respectively have plural pointed ends 341 extending out of the rotatable disc 31 in four directions, a through groove 342 for each pierce rod 32 to pass through and also through the insert hole 311 of the rotatable disc 31. Further an engage groove 343 is provided in each shove plate 34, crossing with the through groove 342. Each pierce rod 32 has a center slot 321 in two ends for a spring position member 35 to stride therein. Each spring position member 35 has two feet 351 extending outward.

Figure 11:
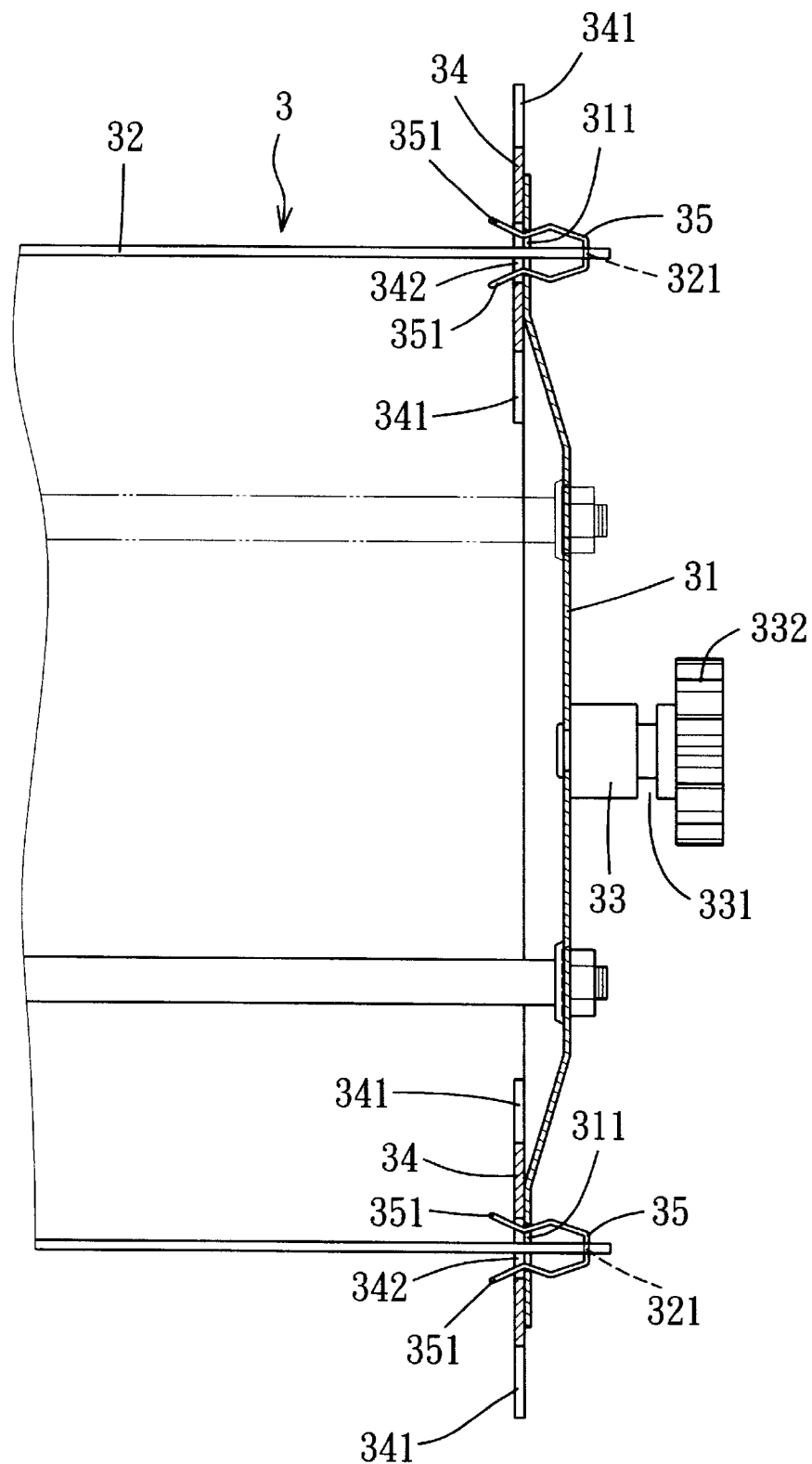
FIG. 11 is a partial front view of the rotating frame combined in the present invention.
Figure 12:
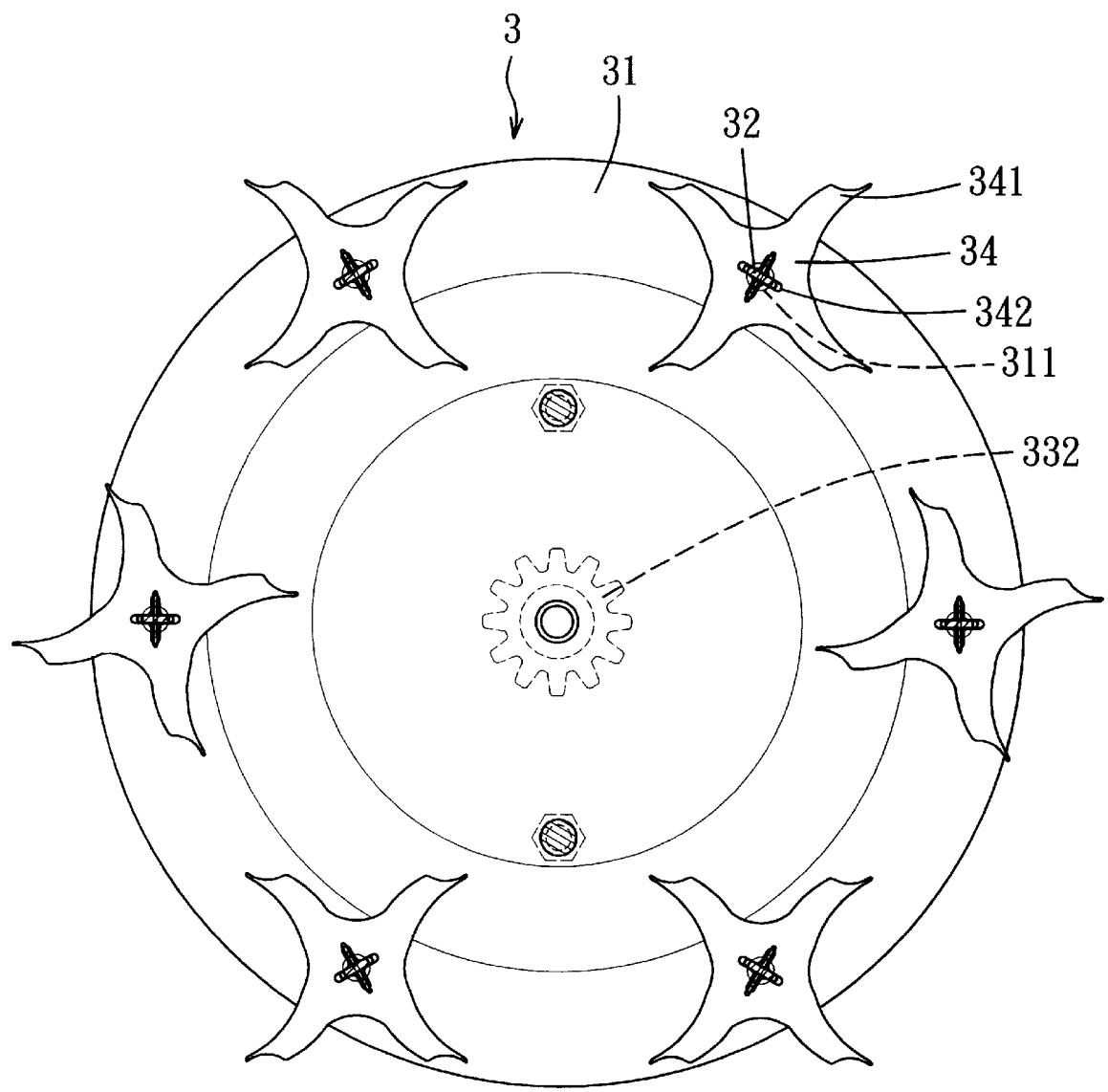
FIG. 12 is a partial side view of the rotating frame combined in the present invention.

The pierce rods 32 respectively have one end passing through the rotatable disc 31 not provided with the shove plate 34 as shown in FIG. 9, and the other end passing though the through grooves 342 of the shove plate 34 and the insert hole 311 of the rotatable disc 31 provided with the shove plate 34 and extending out of the rotatable disc 31. At this position, the engage grooves 343 of the shove plate 34 just face a pair of the position grooves 312, with the spring position members 35 striding in the insert grooves 321 of the pierce rods 32. Then the opening ends of the position members 35 face the rotatable discs 31, with the two feet 351 extending and inserting in the position grooves 312 and the engage grooves 343 as shown in FIGS. 11 and 12, permitting the pierce rods 32 inserted between the two rotatable discs 31, finishing assembling the rotating frame 3 as shown in FIGS. 3 and 9.

Figure 14:
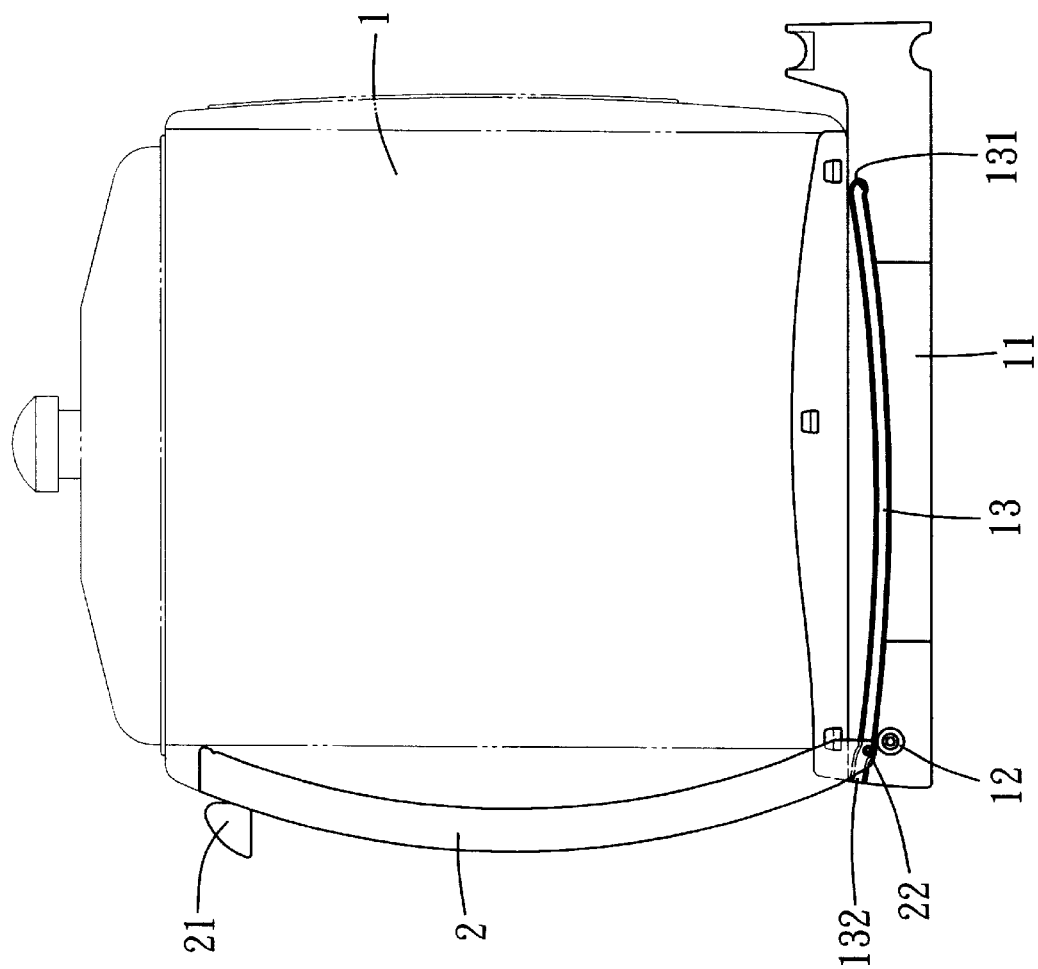
FIG. 14 is a side view of the door partially combined in the present invention.

The door 2 and the housing 1 are combined as shown in FIGS. 13, 14, with the slide rollers 22 of the door inserted inside the slide rail 13, with the slide rollers 22 entering the exit 132 of the slide rail at the other side and bending to be located in the slide rail 13. In this position, the two slide rollers 22 of the door 2 are located at the front end of the slide rail 13 of the support base 11, the door 2 standing upright and kept to close up the front side of the housing 1 by means of some common engaging means, which is omitted in describing as it is well known art, as shown in FIG. 13, forming the toaster oven in the invention.

Figure 15:
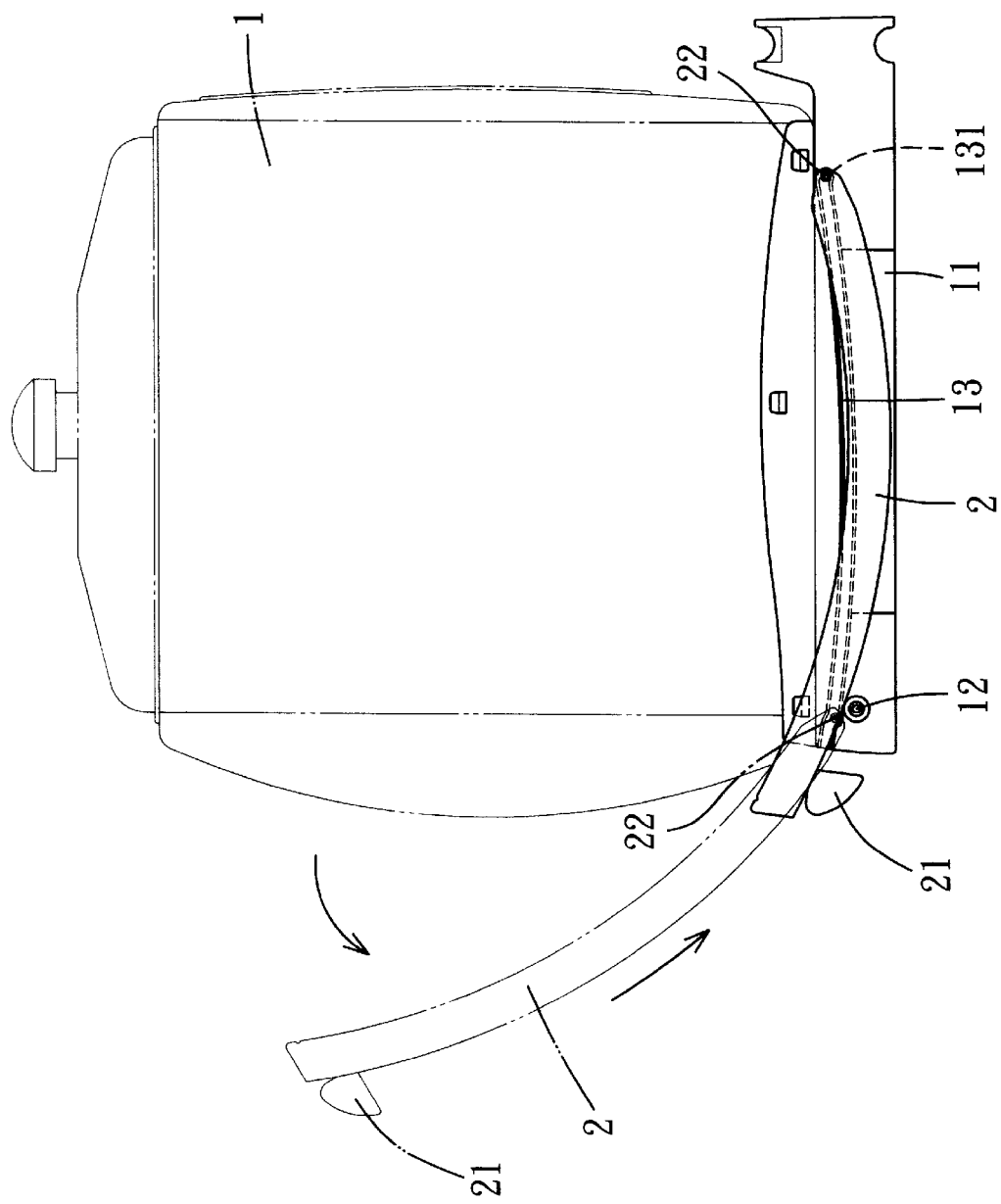
FIG. 15 is a side view of the door being opened in the present invention.

If the door 2 is needed to be opened to put in or take out food, first pull the grip 21 to force the door swing outward with the slide rollers 22 of the door 2 as fulcrums to lie flat with the two ends respectively rest on the auxiliary rollers 12, as shown in FIG. 15. Then continue to push the door 2 move along by means of the slide rollers 22 slide along the slide rail 13 and gradually move under the housing 1, until the slide rollers 22 reach the end of the slide rail 13 and sink in the position recess 131 to keep the door 2 stabilized under the housing 1. Thus the door 2 cannot automatically slide out from under the housing 1, as shown in FIG. 15. On the contrary, if the door 2 is to be closed, only pull the door 2, forcing the slide rollers 22 separate from the position recess 131 with the slide rollers 22 reaching the front end of the slide rail 13, and pull up the door 2 to close up the housing 1, as shown in FIG. 14.

Figure 16:
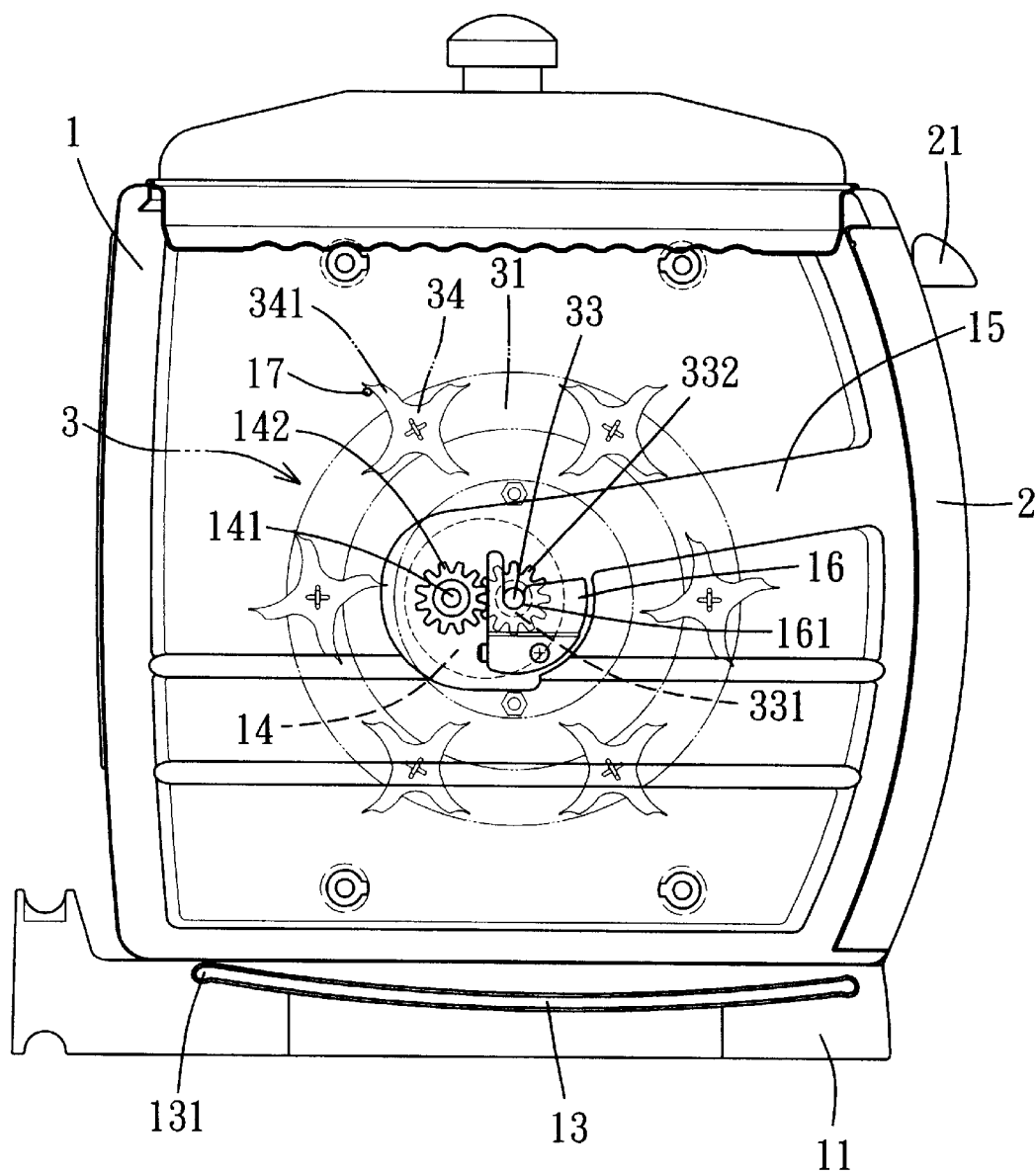
FIG. 16 is a side view of the rotating frame used in one way in the present invention.

As for placing the rotating frame 3 in the housing 1, referring to FIGS. 6 and 7, align the shaft 33 of the rotating frame 3 to the guide slot 15 and move along the guide slot 15 into the housing 1. When the shaft 33 reaches the chamber 151 at the end of the guide slot 15, let the annular groove 331 stride over the groove 161 of the support member 16 so as to hang the rotating frame 3 in the housing 1. The subordinate gear 332 at the end of the shaft 33 of the motor 14 is then located in the chamber 151 and engages the transmitting gear 142 on the shaft 141 of the motor 14, as shown in FIG. 16, so the rotating frame 3 can be rotated by the subordinate gear 332 on the outer shaft 33 of the rotatable disc 31 rotated by the transmitting gear 142. On the contrary, only pulling up the rotating frame 3 and separating the shaft 33 from the groove 161 of the support members 16 can permit the rotating frame 3 taken out of the housing 1.

Figure 17:
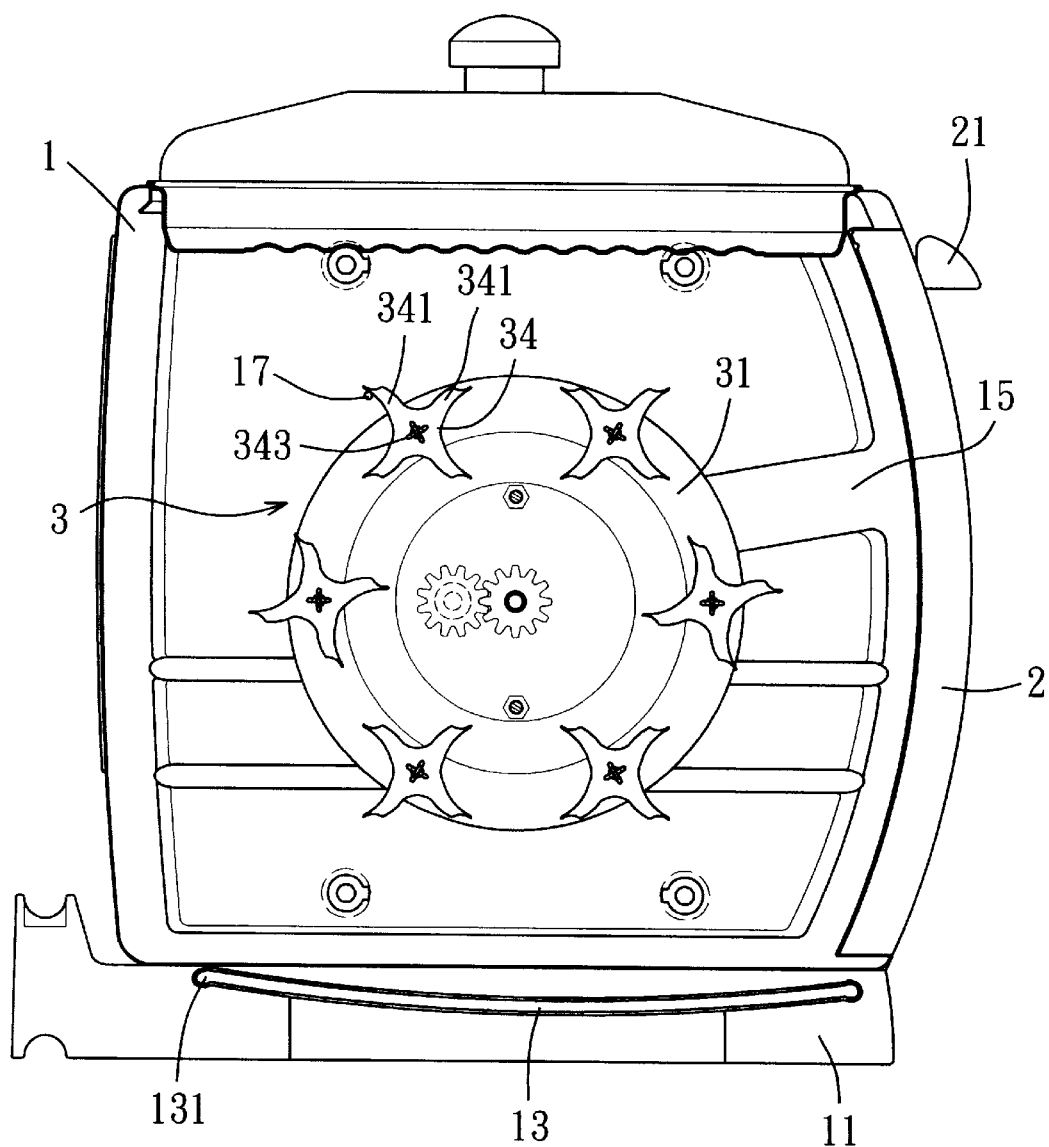
FIG. 17 is a side view of the rotating frame used in another way in the present invention.
Figure 18:
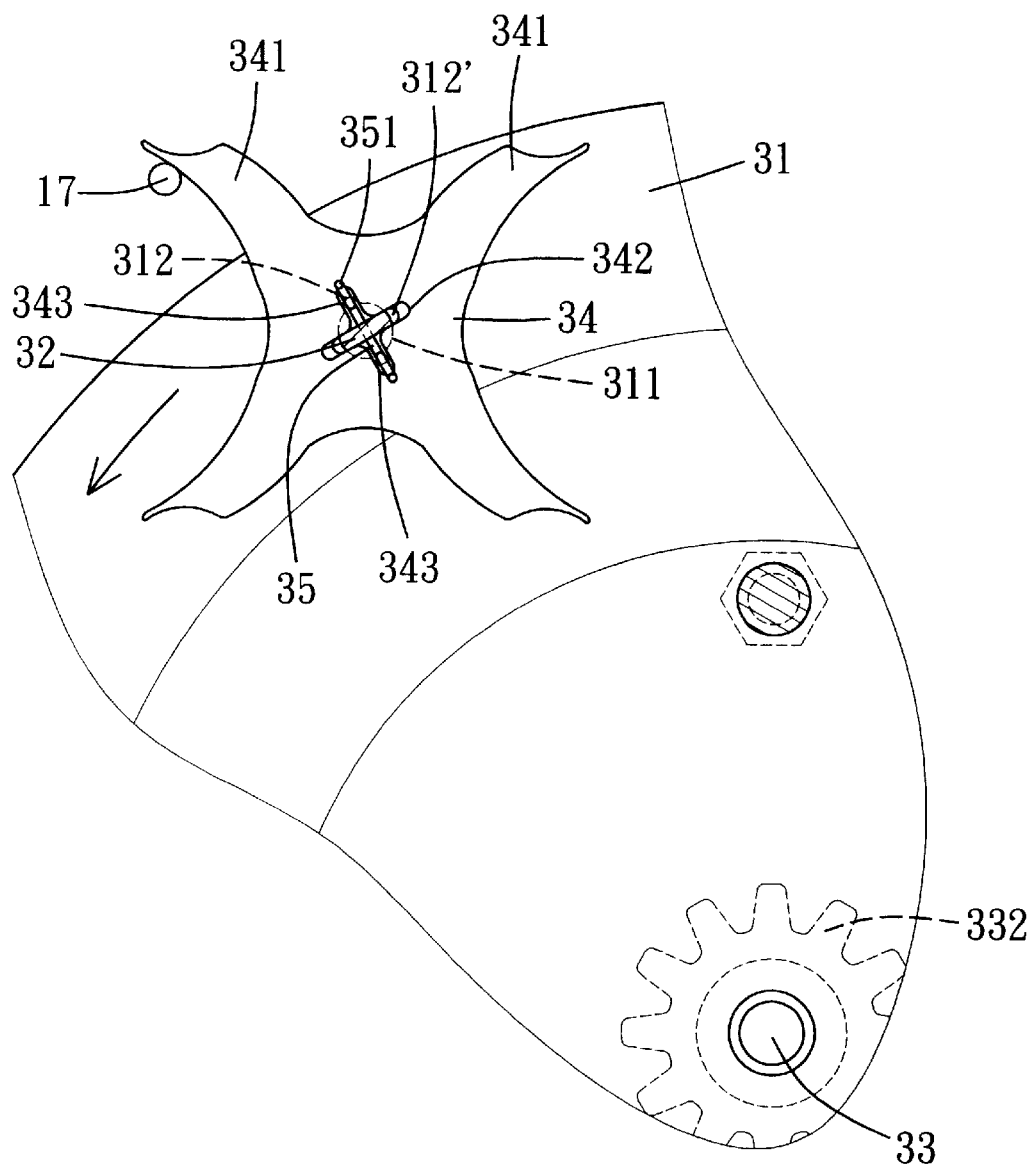
FIG. 18 is a partial side view of the rotating frame in one stage of rotation in the present invention.
Figure 19:
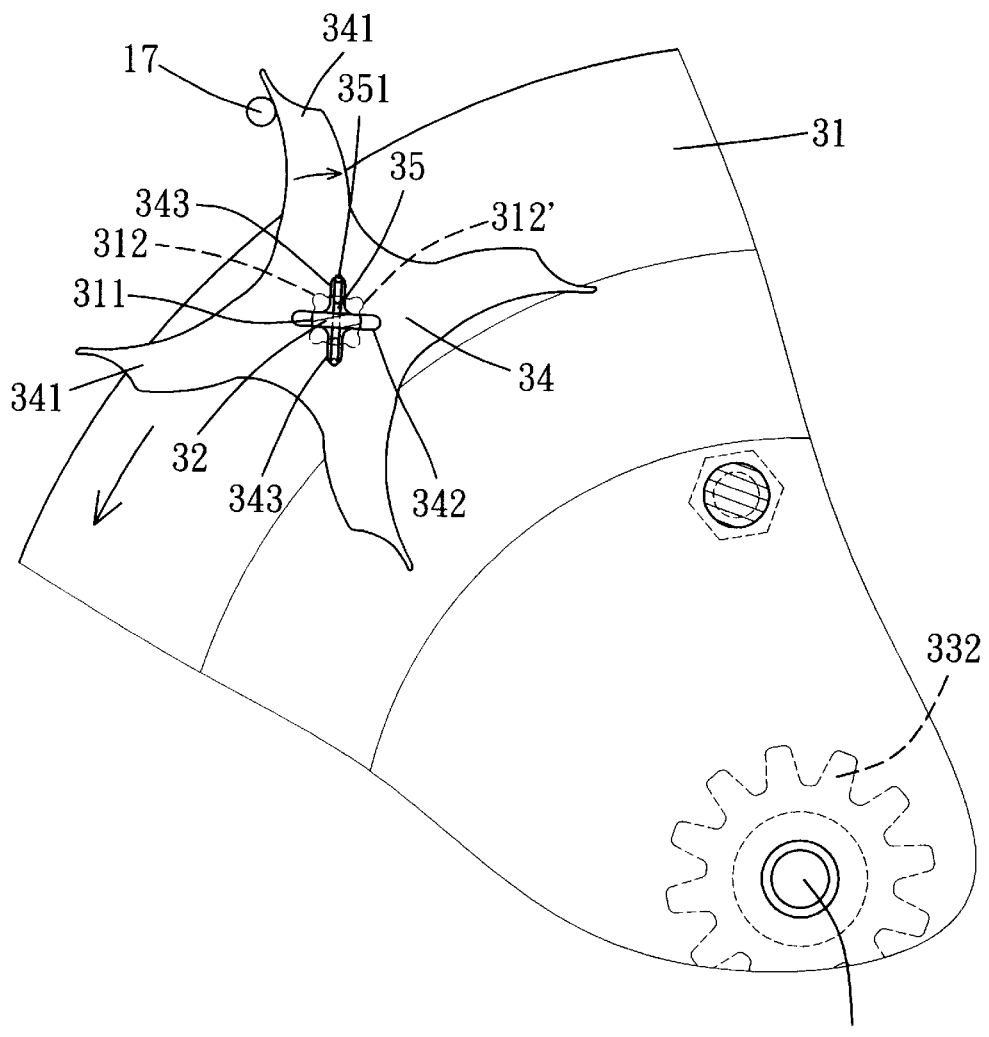
FIG. 19 is a partial side view of the rotating frame in another stage of rotation in the present invention: and, FIG. 20 is a partial side view of the rotating frame in another stage of rotation in the present invention.
Figure 20:
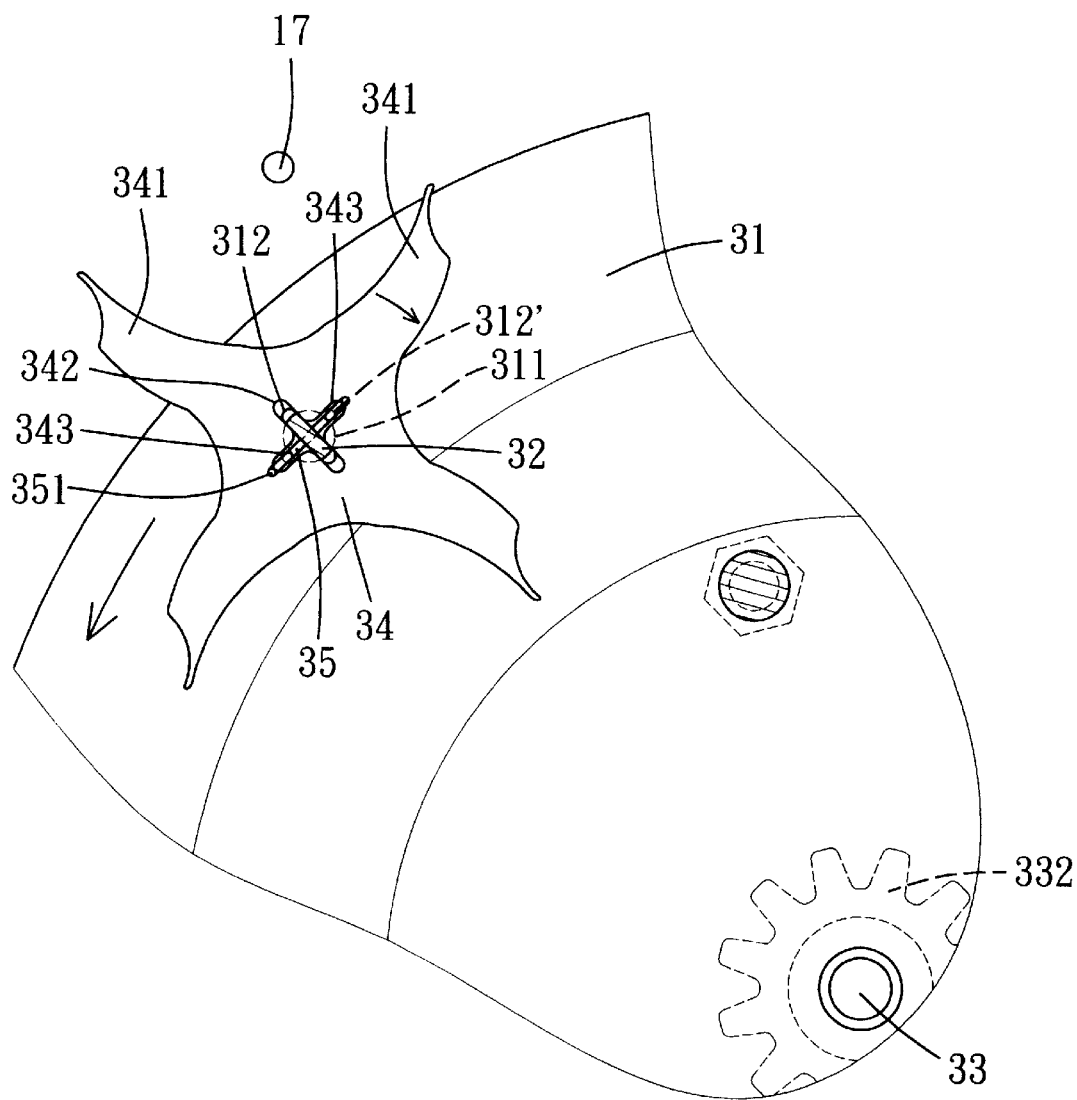

Next, after the rotating frame 3 with food pierced thereon is placed in the housing 1, as shown in FIG. 17, the motor 14 (not shown in the Figures) is started to rotate the rotating frame 3 with food together as shown in FIG. 18. When the rotating frame 3 rotates nearer one of the pierce rods 32 and an activating end 341 of one of the shove plate 34 moves nearer and is stopped by the stop rod 17 of the housing 1, the pierce rod 32 and the position member 35 then rotates in the reverse direction to the rotate disc 31 owing to the stop rod 17 stopping the shove plate 34, as shown in FIG. 19. Then the two feet 351 of the position member 35 shrink inward, separating from the position groove 312 of the insert hole 311 of the rotating disc 31. When the shove plate 34 rotates together with the rotating frame 3 and is stopped by the stop rod 17 to rotate in a reverse way to let the feet 351 just face the position grooves 312', the two feet 351 of the position member 35 extend outward again to insert in the position groove 312', as shown in FIG. 20. In this mode, the pierce rod 32, the shove plate 34 and the position member 35 rotate together for a certain angle and stop in that position and then rotate in a reverse way after stopped next time by the stop rod 17.

As understood from the aforesaid description, the door 2 in the invention does not swing outward when opened, not taking space except the housing 1, but directly hidden under the housing 1, effectively saving space in using the roaster oven, without no fear that the door 2 may be hit or stricken by passersby or automatically swing to burn a user. In addition, the exit 132 is provided on the slide rail 13 to facilitate not only assembly, but also washing or cleaning by taking the door 2 off the housing 1 by a user himself/herself. The guide slot 15 of the housing 1 is designed to permit the rotating frame 3 possible to be taken out or put in horizontally, and the rotating frame 3 is rotated by the motor 14 via the transmitting gear 142, still holding the advantage of the conventional roaster oven, and at the same time resolving the problem of not easy alignment of the rotating frame and fear of burning by the heater in handling the conventional roaster oven. Moreover, self turning of the piece rods 32 and the shove plates 34 on the rotatable discs 31 by means of the position member 35 can permit each pierce rod 32, each shove plate 34 and each position member 35 may be rotated until they are stopped by the stop rod 17 and then rotate in a reverse way for a certain angle against rotation of the rotatable discs 31 and so does the food on each piece rod also rotate in a reverse way for a certain angle so to get roasted every portion of the food in a balanced way by the heaters on the bottom and on the upper portion of the housing 1.

Further, the roaster oven in the invention is also convenient in handling, using and transporting, having higher safety in using than the conventional roaster oven.

While the preferred embodiment of the invention has been described above, and it will be recognized and understood that various modifications may be made therein and the appended claims are intended to cover all such modifications that may fall within the spirit and scope of the invention.

I claim:

1. A roaster oven comprising a housing and a door combined with a front side of said housing; characterized by said housing having two support bases respectively fixed at two opposite sides of a bottom of said housing, inner vertical sides of said two support bases and the bottom of said housing defining a hollow space, an auxiliary roller respectively connected pivotally to an inner front end of each said support base and a lengthwise slide rail formed integral to correspond to each other; a slide roller respectively connected to two opposite sides of a bottom edge of said door, each said slide roller located on said slide rail of each said support base; said slide rollers located on front ends of said two slide rails when said door is closed in the front side of said housing, two opposite side edges flatly resting on said auxiliary rollers and said slide rollers sliding along said slide rails backward to the bottom of said housing and rotation of said auxiliary rollers guiding said door to move to under said housing.

2. The roaster oven as claimed in claim 1, wherein said two slide rails of said two support bases have a position recess formed in a rear end of said each slide rail, and said slide rollers sink in said position recesses and are stabilized temporarily at that position when said slide rollers slides to reach said position recesses of said slide rails.

3. The roaster oven as claimed in claim 1, wherein one of said two support bases has an exit formed to curve up in a front end wall facing a front end of said slide rail so as to permit said slide rollers of said door to move in and out of said exit.

4. A roaster oven comprising a drive motor fixed on an inner wall of a housing, said motor having a shaft extending inward said housing, and a rotating frame consisting of two rotatable disks and plural pierce rods fixed spaced apart between said two rotatable disks; characterized by a guide slot formed respectively in two inner vertical sides of said housing at the same level to correspond to each other, each said guide slot extending from a front side end of said housing to an inner portion, a chamber formed to curve down at an end of each said guide slot, a support plate fixed on an upper edge of said chamber and having a curved recess in an intermediate portion; said shaft of said drive motor extending in said chamber, a transmitting gear fixed on an end of said shaft; a shaft rod fixed at a center of an outer side wall of each said rotatable disk, a subordinate gear fixed on an end of said shaft rod facing an end of said motor; said rotating frame moving into said housing by means of said two shaft rods horizontally sliding along said two guide slots of said housing, said shaft rod fitting in said curved recess of said support plate to permit said rotating frame hanging in said housing, said subordinate gear engaging said transmitting gear of said motor so as to rotate said rotating frame.

5. The roaster oven as claimed in claim 4, wherein said guide slots extend from an end of an inner wall of said two opposite sides of said housing facing two inner sides of said door, sloping down toward the interior of said housing.

6. The roaster oven as claimed in claim 4, wherein said shaft rods of said two rotatable discs have an annular groove stridingly fitting in said recess of said support plate.

7. A roaster oven comprising a housing and a rotating frame placed in said housing; said rotating frame consisting of two rotatable discs and plural pierce rods inserted between said two rotatable discs, said rotatable discs respectively having an insert hole to correspond to each other for a shaft rod to insert therein; characterized by a stop rod provided on an inner side wall of said housing to extend toward said rotating frame; one of said rotatable discs near one side of said stop rod having an insert hole larger than that of said pierce rods, plural position grooves formed in hole edges of said insert hole, plural shove plates provided on an inner wall of each said rotatable disc, each shove plate having an insert groove for each said pierce rods to pass through, an engage groove provided to cross said insert groove, each said pierce rod having an insert groove formed in an end facing each said shove plate, each said pierce rod passing through said insert groove and said insert hole of said rotatable disc, a spring position member striding in said insert groove and having two feet extending to insert in said position groove and said engage groove; one of said shove plates stopped by said stop rod and said pierce rod and said position member rotated by said stop rod in a reverse way, said two feet of said position member separating from said position groove to contact a hole edge of said insert hole when any of said shove plates moves to contact said stop plate, said two feet of said position member extending outward again to stabilize said pierce rod, said shove plate and said position member in place at the same time when said shove plate rotates further to let said two feet of said position member facing the next position groove of said rotatable disc.

8. The roaster oven as claimed in claim 7, wherein said shove plates are located inside said rotatable discs, having plural activating tips extending out of said rotatable discs to contact said stop rod.

9. The roaster oven as claimed in claim 7, wherein said insert groove of said each said shove plate crosses in a right angle with said engage groove.

* * * * *